Feb. 27, 1973   F. R. McFARLAND ET AL   3,717,895
BATTERY TERMINAL POST AND POST CLAMP CLEANER TOOL
Filed March 19, 1971                                3 Sheets-Sheet 1

INVENTORS
Frederick R. McFarland
BY Walter L. Diffenderfer

Paul & Paul
ATTORNEYS.

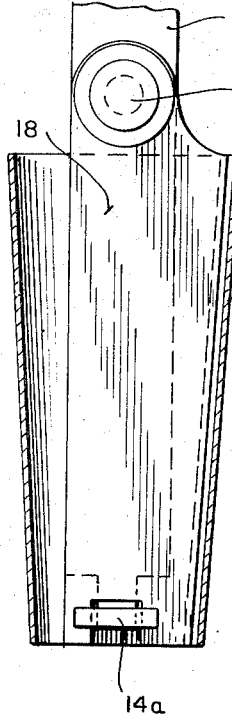
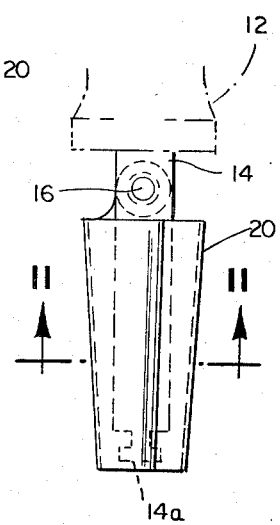
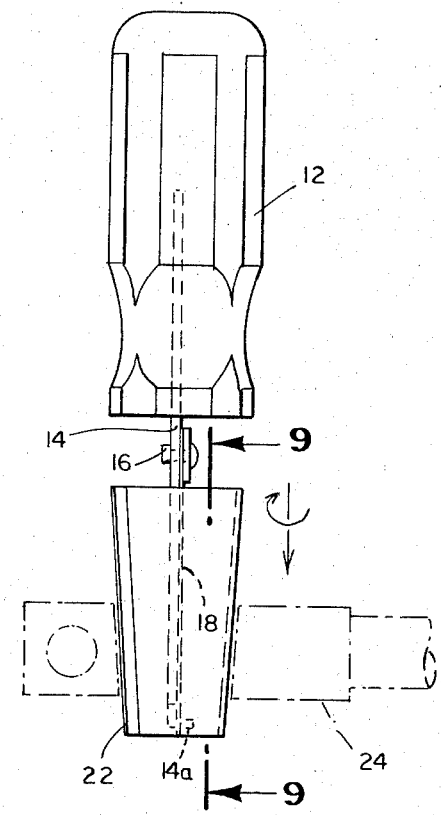
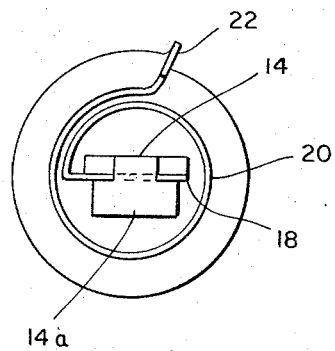
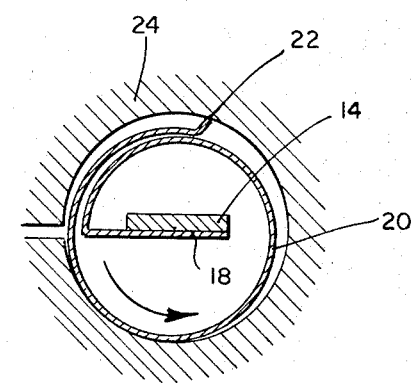

Feb. 27, 1973   F. R. McFARLAND ET AL   3,717,895
BATTERY TERMINAL POST AND POST CLAMP CLEANER TOOL
Filed March 19, 1971                          3 Sheets-Sheet 3

INVENTORS.
Frederick R. McFarland
BY  Walter L. Diffenderfer

Paul + Paul
ATTORNEYS.

3,717,895
BATTERY TERMINAL POST AND POST CLAMP CLEANER TOOL

Frederick R. McFarland and Walter L. Diffenderfer, Lancaster, Pa., assignors to K-D Manufacturing Company, Lancaster, Pa.
Filed Mar. 19, 1971, Ser. No. 126,056
Int. Cl. H01r 43/00
U.S. Cl. 15—105      8 Claims

ABSTRACT OF THE DISCLOSURE

Battery post and battery post clamp cleaning tools comprise, in their operative portions, wound sheet spring steel with axially disposed lips projecting inwardly and outwardly respectively. The inwardly projecting lip conforms in shape to the outer surface of the battery post while the outwardly projecting lip conforms to the surface shape of the post hole in the battery clamp.

---

This invention relates to specialized tools for effectively and conveniently cleaning battery terminals and clamp connectors, more specifically automotive battery posts and post clamps. More particularly, it relates, in its preferred embodiment, to a single combination tool for cleaning both battery posts and battery post clamps.

Corrosion and the formation of corrosion deposits on battery terminals, particularly battery posts and battery posts clamps, is a common and well known problem. Electrical conductivity between battery posts and associated posts clamps often tends to be poor because of corrosion and deposits. In the case of an automobile, such corrosion and deposits, may make the start-up of the engine, particularly in cold weather impossible or at best difficult.

Initially establishing electrical contact between new clamps and/or a new battery may also be difficult, particularly when either the clamps and/or the battery posts have been exposed to the atmosphere for any period of time. This problem also is enhanced by cold weather.

To solve the foregoing problems, it is obviously necessary to remove corrosion and corrosion deposits from battery terminal posts and post clamps. The minute physical nature of many of these deposits and their adherence to the underlying metal makes effective removal very difficult, however. In the past, this has usually been done with sandpaper or a wire brush. Special tools have also been proposed such as a form of wire brush which includes one section comprised of inwardly projecting wire bristles surrounding an opening corresponding in size roughly to that of a typical battery post and a second section comprised of a circular wire brush corresponding in size roughly to that of the opening in a typical battery post clamp. Such tools have not been found to be effective in all cases.

It is the general object of the present invention to provide improved tools for conveniently and effectively removing corrosion and corrosion deposits from battery posts and clamps associated therewith and for mechanically treating the contacting surfaces thereof for optimum electrical contact therebetween.

It is a further object of this invention to provide such tools which are simple and inexpensive.

Still a further object of this invention is to provide a single combination tool for effectively cleaning both battery posts and associated post clamps.

These and other objects, which will become apparent from the following discussion, are met by hand held tools one operative portion of which comprises sheet spring steel turned into frusto conical shape with an outer axially disposed edge conforming to the inner shape of a battery post clamp and a second operative portion of which comprises sheet spring steel cylindrically wound with an inner axially disposed edge conforming to the outer shape of a battery post.

In the preferred embodiment of this invention the two foregoing operative tool sections are each movably connected to a single handle in which one of the operative portions is enclosed while the other is in working position and vice versa.

This invention may be better understood by reference to the following detailed description of the invention taken together with the appended claims and the accompanying drawings in which:

FIG. 7 is a side view of the battery post clamp cleaning tool of the present invention showing its operative relation to a battery post clamp;

FIG. 8 is another side view of the tool shown in FIG. 7;

FIG. 9 is a side sectional view of the working part of the tool shown in FIG. 7;

FIG. 10 is a bottom view of the tool shown in FIG. 7;

FIG. 11 is a cross-sectional view of the working part of the tool shown in FIG. 7 together with a battery post clamp within which the working part of the tool shown in FIG. 7 is disposed for effecting the cleaning operation;

Figure 3:
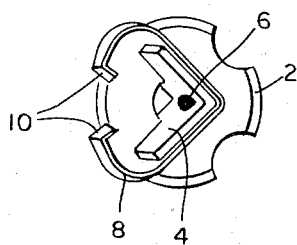
FIG. 3 is a bottom view of the tool shown in FIG. 1.
Figure 2:
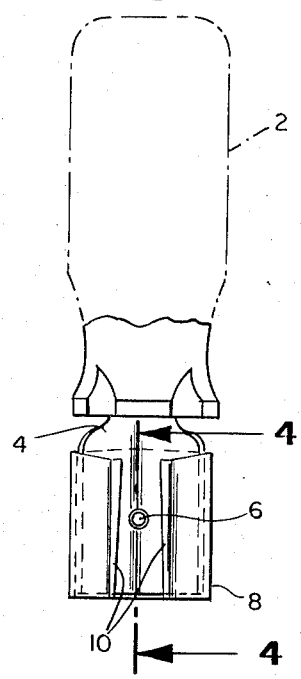
FIG. 2 is another side view of the tool shown in FIG. 1.
Figure 1:
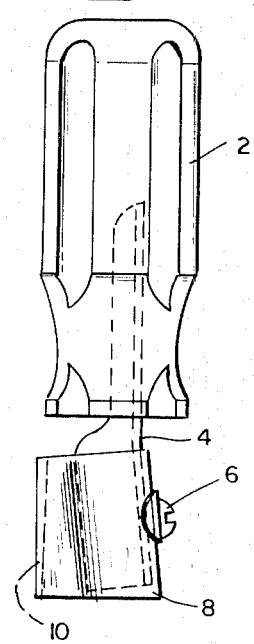
FIG. 1 is a side view of one form of battery post cleaning tool of the present invention.
Figure 5:
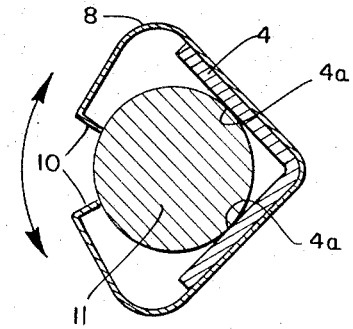
FIGS. 5 and 6 are cross-sectional views, at two locations, of the cleaning tool and the battery post shown in FIG. 4.
Figure 4:
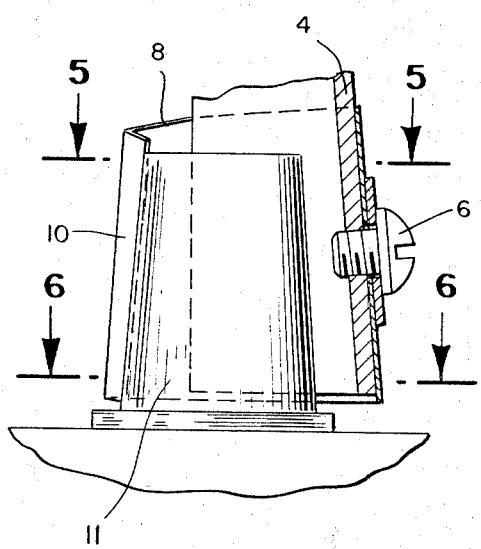
FIG. 4 is an enlarged detailed view, partially in section, of the tool shown in FIG. 1 and a typical battery post with the tool mounted thereon for effecting the cleaning operation.
Figure 6:
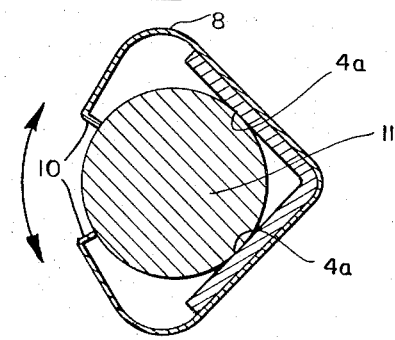

Referring now more specifically to FIGS. 1-6, there is shown a hand held battery post cleaning tool comprised of a handle 2, a supporting member 4 projecting therefrom, along the axis thereof which coincides with that of the battery post to be cleaned, which supporting member 4 is secured by bolt 6 to sheet spring steel post cleaning element 8 forming a geometric shape about the tool axis, which shape is closed except for an axial opening with inwardly projecting lips 10 the ends of which are tapered and spaced from opposing bearing surfaces 4a of supporting member 4 to conform to the diameter and taper of a battery terminal post 11 to be cleaned. It will be noted that supporting member 4 is shaped, by bending along a line parallel to the post and tool axis, to increase the contact area of surface 4a.

In using the tool shown in FIGS. 1-6 cleaning element 8 is forced downwardly over battery terminal post 11 by axial pressure on handle 2 thereby engaging the surface of battery terminal post 11 between cleaning element lips 10 and supporting member opposing surface 4a. Corrosion deposits, such as lead oxide, and other soft surface irregularities are then removed by rotational movement of cleaning element 8. The surface of post 11 is thus effectively cleaned throughout its contact surface area while the precise frusto conical shape of battery terminal post 11 is maintained for optimum electrical contact with an associated post clamp. The elasticity of the sheet spring steel material of which cleaning element 8 is comprised and the relative rigidity of supporting member 4 which includes opposing surface 4a are important to ensure that cleaning element lips 10 engage the surface of battery terminal post 11 along the length thereof. This in turn ensures effective cleaning action. The elasticity of element 8 also prevents damage to battery terminal post 11, which is usually comprised of a soft metallic material, by preventing excessive inward pressure of cleaning element lips 10 which may otherwise be produced by excessive downward axial pressure on handle 2.

Referring now to FIGS. 7–11, showing the battery post clamp cleaning tool of the present invention and a typical battery post clamp in operative relation thereto, there may be seen clamp cleaner handle 12, a clamp cleaner element supporting member 14 secured, by rivet 16, to the inner end 18 of a concentrically wrapped sheet spring steel clamp cleaning element 20 with outwardly projecting lip 22 with the end thereof tapered and spaced from opposed outer surface 20a of clamp cleaning element 20 so as to conform to the inner geometry of the battery terminal post hole in a battery terminal clamp member 24.

In utilizing the battery clamp cleaning tool of the present invention as shown in FIGS. 7–11, cleaning element 8 is inserted in the battery post hole of clamp 24 and with axial pressure on handle 12 the cleaning element on outer lip 22 engages the tapered inner surface of the post hole in clamp 24. Rotational movement of handle 12 and clamp cleaning element 20 results in effective cleaning and removal of corrosive deposits along the whole axial length of the post hole in clamp 24 leaving generally unexposed metal for good electrical contact and removing soft surface irregularities so that the post hole conforms precisely to the frusto conical configuration of the associated battery post. As described with respect to the post cleaning tool, the elasticity of the sheet spring steel cleaning element is important to provide optimum contact with the surface to be cleaned, removal of all deposits from that surface along the whole axial length thereof, reduction of surface irregularities so that the hole conforms almost perfectly to the desired frusto conical shape, and yet prevents damage to the clamp, such as excess metal removal, which might otherwise be produced by excessive axial force on handle 12.

With regard both to the battery post cleaning tool of FIGS. 1–6 and the battery clamp cleaning tool of FIGS. 7–11, it will be noted that cleaning element supporting member 4 and 14, extend substantially along the whole axial length of cleaning elements 8 and 20, respectively, in order to prevent torsional displacement of cleaning element 8 and 20 during the rotational cleaning movement thereof. With respect to the post cleaning tool, supporting member 4, which is relatively inelastic, by providing opposing surface 4a, also serves to enhance the intimate contact of cleaning element lips 10 with post 12 by preventing displacement of the surface opposed to cleaning element lip 10. Such displacement might otherwise prevent or inhibit the effective engagement of cleaning element lips 10 with post 12 along the axial length thereof. With respect to supporting member 14, it will be noticed that a lip 14a is provided at the axial tip thereof in order to inhibit more effectively the lateral or torsional movement of clamp cleaning element 20 during the rotational cleaning movement thereof.

Figure 12:
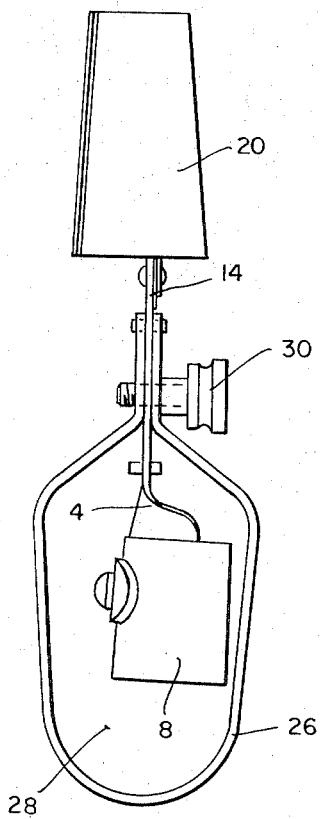
FIG. 12 is a side view of the preferred embodiment of the present invention in which the battery post and battery post clamp cleaning tool are combined.
Figure 13:
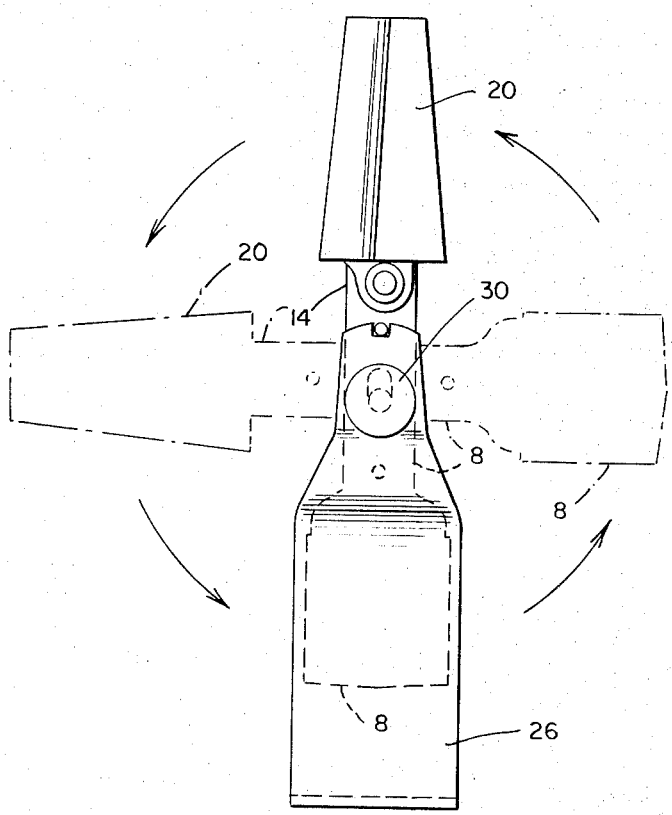
FIG. 13 is another side view of the tool shown in FIG. 12, also showing how certain parts of the tool are rotated in order to place either the post cleaner or clamp cleaner in the operative position.
Figure 14:
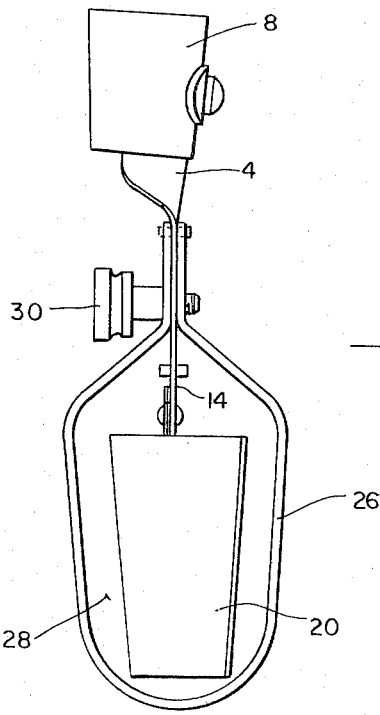
FIG. 14 is a side view of the combination tool shown in FIG. 12 in which the positions of the post cleaner and clamp cleaner are reversed.

Turning now to FIGS. 12–14, there is shown the preferred embodiment of the present invention in which a battery post cleaning element 8 and supporting member 4, such as that previously described with respect to FIGS. 1–6, is combined with a clamp cleaning element 20 and supporting member 14 for use with a common handle 26. Handle 26 includes an opening 28 therein, for storage of either post cleaning element 8 or clamp cleaning element 20, and a pivot and pivot fastening means 30 for rotating one of said cleaning elements from the non-operative position to the operative position thereof while rotating the other of the cleaning elements from the operative to the non-operative positions. Movement of cleaning elements 20 and 8 about pivot 30 is shown by phantom lines in FIG. 13. It will be noted that in FIG. 12 clamp cleaning element 20 is in the operative position while terminal cleaning element 20 is in the non-operative position. In FIG. 14, the opposite is true.

Obviously, the combination of the post cleaner shown in FIGS. 1–6 and the clamp cleaner shown in FIGS. 7–11 into a single combination as shown in FIGS. 12–14 is much preferred for convenience in that a single tool is all that is needed to accomplish both operations necessary to ensure intimate and optimum electrical contact between a battery post and an associated clamp used to make electrical contact with the battery post. The combination of these tools into a single tool in no way impairs the effectiveness of the individual tools of which it is comprised and in fact results in a single tool capable of all the operations necessary to ensure good electrical contact in the connection of a battery post clamp to a battery post.

In typical usage, the battery post and clamp cleaner of the present invention is sized for and is used in the automotive field. Good electrical contact between the battery posts and the associated cable clamps as provided by the tools of this invention ensures a reliable and steady supply of electrical power in this and numerous other applications obviously within the scope of the present invention. Similarly, while the present invention has been described with respect to particular embodiments thereof, it is by no means limited thereto. In fact various possible modifications of the disclosed embodiments may be within the true spirit and scope of the present invention and such possible modifications will be apparent to those skilled in the art. The appended claims are intended to cover all such numerous equivalent and obvious modifications and variations of the present invention which are within the true spirit and scope thereof.

What is claimed is:

1. Combination battery terminal post and post clamp cleaning tool comprising a handle with an opening therein, an elongated supporting member projecting therefrom along an axis thereof and pivotally connected, at a point intermediate the two ends of said support member, to said handle, said support member having attached thereto at one end thereof a battery post cleaning element and at the other end thereof a battery post clamp cleaning element, said supporting member, said cleaning elements and said opening in said handle being adapted to permit movement of one of said elements from a first position within said opening to a second position outside of said opening by pivotal movement of said support member and the contemporaneous movement of the other of said elements from said second position to said first position, said battery post cleaning element comprising sheet spring steel formed into a geometric shape about said axis with an axial separation therein, the edges of said post cleaning element along said separation being turned inwardly and radially of said axis, the ends of said edges and a bearing surface opposite thereto on the inner side of said post cleaning element together conforming in shape and size to the outer shape of a battery terminal post to be cleaned, said battery post clamp cleaning element comprising sheet spring steel concentrically wound about said supporting member with the outer edge thereof being turned outwardly and radially of said concentric axis, the end of said edge and the outer surface opposite thereto on the outer side of said concentric element conforming to the inner surface of the post hole in a battery terminal post clamp to be cleaned.

2. Combination tool, as recited in claim 1, wherein said supporting member projects along the axial length of said post cleaning element on the inner side thereof and forms said bearing surface opposite said ends of said inwardly turned edges of said element.

3. Combination tool, as recited in claim 2, wherein the portion of said supporting member within said cylindrically wound post cleaning element is shaped to increase the contact area of said bearing surface.

4. Combination tool, as recited in claim 1, wherein said supporting member projects through said concentrically wound clamp cleaning element along the axial length thereof and is turned perpendicular to said axis at the axial limit of said element to provide better bending support therefor.

5. Combination tool, as recited in claim 4, wherein said supporting member projects along the axial length of said post cleaning element on the inner side thereof and forms said bearing surface opposite said ends of said inwardly turned edges of said element.

6. Battery terminal post cleaning tool comprising a handle, a supporting member projecting axially therefrom; said supporting member being non-yieldable and shaped so as to bear against one side of a battery terminal to be cleaned; a post cleaning element attached to said supporting member, said post cleaning element comprised of yieldable sheet spring steel cylindrically wound about the end of said support member, said support member extending along the axial length thereof, said spring steel cleaning element having an axial separation therein, both edges of said spring element along said axial separation being turned inwardly and radially of said cylindrical axis, the ends of said edges opposing said support member providing a bearing surface opposite said edges on the inner side of said cylindrical element, said edges and said support member bearing surface together conforming in shape and size to the outer shape of a battery terminal post to be cleaned.

7. Battery terminal post clamp cleaning tool comprising a handle, a supporting member projecting therefrom and, attached to said supporting member, a clamp cleaning element comprised of sheet spring steel concentrically wound with the outer edge thereof being turned outwardly and radially of said concentric axis, the end of said edge and the outer surface opposite thereto on the outer side of said concentric element conforming to the inner surface of the post hole in a battery terminal post clamp to be cleaned.

8. Tool, as recited in claim 7, wherein said supporting member projects through said concentrically wound clamp cleaning element along the axial length thereof and is turned perpendicular to said axis at the axial limit of said element to provide better bending support therefor.

References Cited

FOREIGN PATENTS 1,038,546   5/1953   France _____ 15—236 R

LEON G. MACHLIN, Primary Examiner

U.S. Cl. X.R.

29—81 R; 30—169; 82—4 R